(12) United States Patent
Kudo et al.

(10) Patent No.: US 11,434,575 B2
(45) Date of Patent: Sep. 6, 2022

(54) REDUCTION ELECTRODE AND MANUFACTURING METHOD THEREOF, AND ELECTROLYTIC DEVICE

(71) Applicant: KABUSHIKI KAISHA TOSHIBA, Minato-ku (JP)

(72) Inventors: Yuki Kudo, Yokohama (JP); Satoshi Mikoshiba, Yamato (JP); Akihiko Ono, Kita (JP); Jun Tamura, Chuo (JP); Ryota Kitagawa, Setagaya (JP); Masakazu Yamagiwa, Yokohama (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 804 days.

(21) Appl. No.: 16/394,869

(22) Filed: Apr. 25, 2019

(65) Prior Publication Data

US 2019/0249318 A1 Aug. 15, 2019

Related U.S. Application Data

(62) Division of application No. 15/251,672, filed on Aug. 30, 2016, now abandoned.

(30) Foreign Application Priority Data

Sep. 14, 2015 (JP) .................................. 2015-180898

(51) Int. Cl.
*C25B 11/02* (2021.01)
*C23C 8/80* (2006.01)
(Continued)

(52) U.S. Cl.
CPC ............... *C25B 11/02* (2013.01); *C23C 8/10* (2013.01); *C23C 8/80* (2013.01); *C23F 17/00* (2013.01);
(Continued)

(58) Field of Classification Search
CPC ........... C23C 8/80; C23C 17/00; C25D 11/00; C25B 3/26
See application file for complete search history.

(56) References Cited

U.S. PATENT DOCUMENTS 7,122,106 B2 * 10/2006 Lin .......................... C25D 9/00
205/205
2012/0219735 A1 * 8/2012 Bakker ................... C01B 32/00
423/592.1
(Continued)

FOREIGN PATENT DOCUMENTS

JP 2003-213472 7/2003
JP 3675793 7/2005
(Continued)

OTHER PUBLICATIONS

Raciti et al Highly Dense Cu Nanowires for Low-Overpotential CO2¬ Reduction, Nano Letters, 2015, 15, 6829-6835. (Year: 2015).*
(Continued)

*Primary Examiner* — Brian W Cohen
(74) *Attorney, Agent, or Firm* — Oblon, McClelland, Maier & Neustadt, L.L.P.

(57) ABSTRACT

A reduction electrode of an embodiment includes a metal base material and a plurality of metal nanowires provided on the metal base material. The plurality of metal nanowires include metal nanowires whose average height of contour curve of surface is 20 nm or less for 50% or more in a number ratio. The plurality of metal nanowires are formed by reducing a plurality of metal oxides each having a nanowire shape formed on the metal base material by an electrochemical reduction method. A reduction process of the metal oxides includes a first process of passing a current under a constant current condition where an absolute value is 5 mA/cm$^2$ or more through the plurality of metal oxides,
(Continued)

and a second process of passing a current under a constant potential condition through the plurality of metal oxides.

10 Claims, 7 Drawing Sheets

(51) Int. Cl.
- C25D 11/00 (2006.01)
- C23C 8/10 (2006.01)
- C23F 17/00 (2006.01)
- C25B 1/04 (2021.01)
- C25B 3/25 (2021.01)
- C25B 9/17 (2021.01)

(52) U.S. Cl.
CPC .......... *C25B 1/04* (2013.01); *C25B 3/25* (2021.01); *C25B 9/17* (2021.01); *C25D 11/00* (2013.01); *Y02E 60/36* (2013.01)

(56) References Cited

U.S. PATENT DOCUMENTS

| | | |
|---|---|---|
| 2013/0105304 A1 | 5/2013 | Kaczur |
| 2013/0105305 A1 | 5/2013 | Yang et al. |
| 2013/0157174 A1 | 6/2013 | Masel et al. |
| 2014/0158526 A1 | 6/2014 | Guo et al. |
| 2015/0096698 A1 | 4/2015 | Hiroshi et al. |

FOREIGN PATENT DOCUMENTS

| | | |
|---|---|---|
| JP | 5321218 | 10/2013 |
| JP | 5624860 | 11/2014 |
| JP | 5683883 | 3/2015 |
| WO | WO 2013/016447 A2 | 1/2013 |

OTHER PUBLICATIONS

Supplemental Information for Raciti et al Highly Dense Cu Nanowires for Low-Overpotential CO2¬ Reduction, Nano Letters, 2015, 15, 6829-6835. (Year: 2015).*

Y. Hori, "Electrochemical $CO_2$ Reduction on Metal Electrodes", Modern Aspect of Electrochemistry, No. 42, 2008, 101 pages.

C.W. Li "$CO_2$ Reduction at Low Overpotential on Cu Electrodes Resulting from the Reduction of Thick $Cu_2O$ Films", Journal of the American Chemical Society, 134, 2012, 4 pages.

C.W. Li "Electroreduction of carbon monoxide to liquid fuel on oxide-derived nanocrystalline copper", Nature, 508, 2014, 17 pages.

Ma et al ("Selective electrochemical reduction of CO2 to CO on CuO-derived Cu nanowires", Physical Chemistry Chemical Physics, 17, 2015, pp. 20861-20867 and Supporting Info). (Year: 2015).

Raciti et al ("Highly Dense Cu Nanowires for Low-Overpotential CO2 Reduction", Nano Letters, 15, 10, 2015, pp. 6829-6835) Year: 2015).

Whipple et al ("Microfluidic Reactor for the Electrochemical Reduction of Carbon Dioxide: The Effect of pH", Electrochemical and Solid-State Letters, (Year: 2010).

* cited by examiner

REDUCTION ELECTRODE AND MANUFACTURING METHOD THEREOF, AND ELECTROLYTIC DEVICE

CROSS-REFERENCE TO RELATED APPLICATIONS

This application is a continuation of U.S. application Ser. No. 15/251,672 filed Aug. 30, 2016, and is based upon and claims the benefit of priority from Japanese Patent Application No. 2015-180898, filed on Sep. 14, 2015; the entire contents of each of which are incorporated herein by reference.

FIELD

Embodiments described herein relate to a reduction electrode of carbon dioxide and a manufacturing method thereof, and an electrolytic device.

BACKGROUND

In recent years, there has been concerned about depletion of fossil fuels such as petroleum and coal, and renewable energy that can be sustainably utilized is increasingly expected. As the renewable energy, there can be cited a solar cell, wind power generation, and so on. There is a problem that stable supply of electric power is difficult because a power generation amount thereof depends on weather and natural states. Accordingly, it has been tried to store the electric power generated by the renewable energies into storage batteries to stabilize the electric power. However, when the electric power is to be stored, there are problems that cost is required for the storage batteries, or loss is generated at the power storage time.

There has been noticed technologies where water electrolysis is performed to produce hydrogen ($H_2$) from water, or carbon dioxide ($CO_2$) is electrochemically reduced to be converted into chemical substances (chemical energies) like carbon compounds such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), and ethylene ($C_2H_4$) by using the electric power generated by the renewable energy in response to the above-stated problems. When these chemical substances are stored in a cylinder or a tank, there are advantages that it is possible to reduce an energy storage cost, and in addition, an amount of storage loss is small compared to a case when the electric power (electric energy) is stored into the storage batteries.

As an electrolytic device of carbon dioxide, a device including an electrolytic tank storing an electrolytic solution containing water ($H_2O$) and carbon dioxide ($CO_2$), an anode (oxidation electrode) and a cathode (reduction electrode) immersed in the electrolytic solution is general. When hydrocarbon or the like is produced by an electrolytic reaction of carbon dioxide, a metal electrode of copper, a copper alloy, and the like is used for the cathode. In a conventional electrolytic device, production amounts of carbon monoxide and formic acid each having characteristics that the number of electrons used for a reduction reaction of carbon dioxide is small, and a structure is simple are large as reduction products of carbon dioxide. On the other hand, production amounts of organic compounds like carboxylic acids such as acetic acid, alcohols such as methanol and ethanol, alkanes such as methane and ethane, alkenes such as ethylene are small.

For example, when ethanol is produced from carbon dioxide, overpotential when ethanol is produced is large, and a current density which contributes to the production of ethanol becomes small in a conventional metal electrode. Accordingly, a voltage loss becomes large at the electrolytic device, and conversion efficiency from carbon dioxide to ethanol becomes small. Among the carbon compounds as the reduction products of carbon dioxide, the alkanes and the alkenes are gas components as same as carbon monoxide, though usability thereof is higher than carbon monoxide. The alcohols are fuel substances, and usability thereof is further higher. It is therefore demanded to increase the production amounts of the organic compounds such as the alcohols, the carboxylic acids, the alkanes, the alkenes as the reduction products of carbon dioxide.

DETAILED DESCRIPTION

According to an embodiment, there is provided a reduction electrode of carbon dioxide including a metal base material and a plurality of metal nanowires provided on the metal base material. In the reduction electrode of the embodiment, the plurality of metal nanowires include metal nanowires whose an average height of a contour curve of surface is 20 nm or less for 50% or more in a number ratio.

According to another embodiment, there is provided an electrolytic device including: an electrolytic tank which stores an electrolytic solution containing water and carbon dioxide; the reduction electrode according to the embodiment which is immersed in the electrolytic solution and produces carbon compounds by reducing carbon dioxide; and an oxidation electrode which is immersed in the electrolytic solution and produces oxygen by oxidizing water.

Hereinafter, the reduction electrode according to the embodiment and a manufacturing method thereof, further the electrolytic device using the reduction electrode according to the embodiment are described with reference to the drawings. In each embodiment, substantially the same components are denoted by the same reference signs and a description thereof will be omitted in some cases. The drawings are schematic, and there are cases when a relationship between a thickness and a planar size, a ratio among the thicknesses of respective parts and so on may differ from actual sizes.

First Embodiment/Reduction Electrode and Manufacturing Method Thereof

Figure 1:
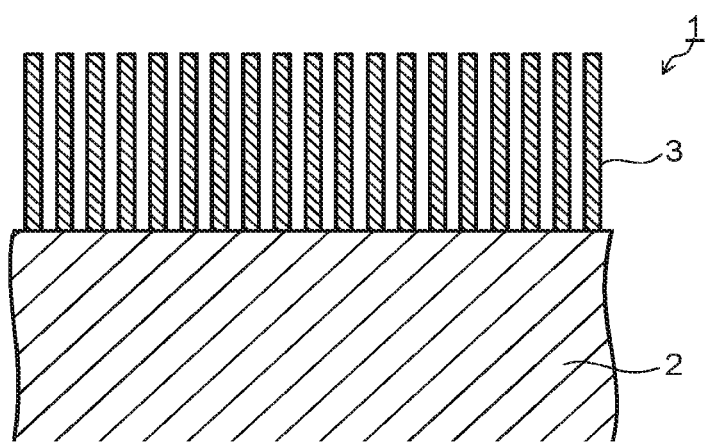
FIG. 1 is a sectional view schematically illustrating a configuration of a reduction electrode according to an embodiment.
Figure 2:
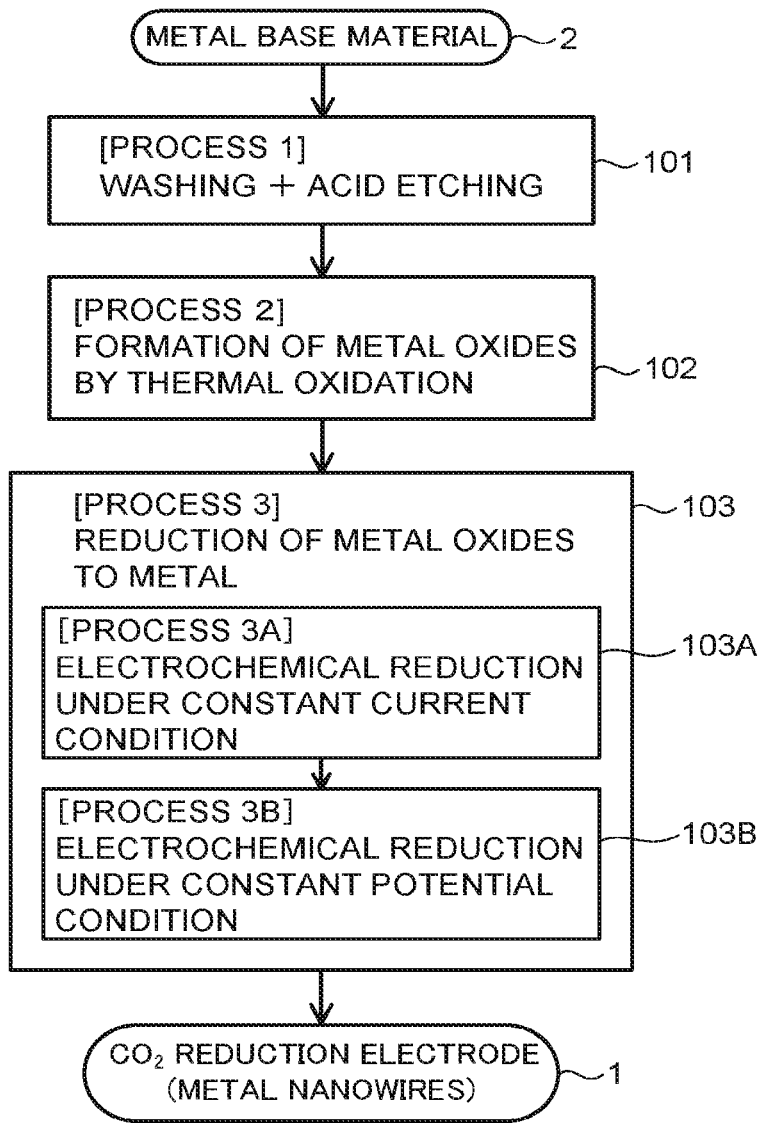
FIG. 2 is a view illustrating a manufacturing process of the reduction electrode according to the embodiment.

FIG. 1 is a sectional view schematically illustrating a configuration of a reduction electrode according to an embodiment. FIG. 2 is a view illustrating a manufacturing process of the reduction electrode according to the embodiment. A reduction electrode 1 illustrated in FIG. 1 is a reduction electrode which is immersed in an electrolytic solution containing water and carbon dioxide, and used when carbon compounds are produced by reducing carbon dioxide. The reduction electrode 1 includes a metal base material 2 and a plurality of metal nanowires 3 provided on the metal base material 2. The metal nanowires 3 are formed by thermally oxidizing a surface of the metal base material 2, forming a plurality of metal oxides each having a nanowire shape on the metal base material 2, and thereafter, reducing the plurality of metal oxides by an electrochemical reduction method, as it is described later in detail.

It is preferable to apply a metal material having conductivity capable of producing the carbon compounds by reducing carbon dioxide and capable of decreasing overpotential of such reaction for the metal base material 2 which constitutes the reduction electrode 1. As the metal material as stated above, there can be cited conductive materials containing at least one selected from among copper (Cu), silver (Ag), gold (Au), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn). The metal material is used as an element metal, an alloy and intermetallic compound containing at least one of these metals, and the like.

Among composing materials of the above-stated metal base material 2, it is preferable to use the metal material (an element, an alloy, an intermetallic compound, and so on) containing at least one selected from copper, palladium, silver, gold, and zinc which is excellent in a catalytic action when carbon dioxide is reduced. Further, as the composing material of the metal base material 2, it is more preferable to use copper, the alloy containing copper, the intermetallic compound containing copper, and so on. The metal nanowires 3 are formed by reducing the plurality of metal oxides each having the nanowire shape formed on the metal base material 2, and therefore, are basically formed with the same material as the metal base material 2.

According to the reduction electrode 1 having the plurality of metal nanowires 3 made up of the above-stated metal materials, it is possible to effectively reduce carbon dioxide and to produce the carbon compounds. Note that carbon monoxide (CO) whose number of electrons (the number of reaction electrons) used for the reduction reaction of $CO_2$ is small is mainly produced, and organic compounds such as the alcohols, the carboxylic acids, the alkanes, the alkenes cannot be enough produced as the carbon compounds being the reduction products of carbon dioxide ($CO_2$) depending on surface states of the metal nanowires 3. Surface roughness of the metal nanowires 3 is therefore lowered at the reduction electrode 1 of the embodiment. According to the reduction electrode 1 having the plurality of metal nanowires 3 with small surface roughness, it is possible to increase production amounts of substances whose number of electrons used for the reduction reaction of $CO_2$ is large, for example, the organic compounds like the alcohols such as methanol and ethanol, the alkanes such as methane and ethane, the alkenes such as ethylene, and the carboxylic acids such as acetic acid.

The reduction reaction from $CO_2$ to CO proceeds in accordance with the following expression (1), and the number of reaction electrons at that time is two. For example, the reduction reaction from $CO_2$ to ethanol ($C_2H_5OH$) proceeds in accordance with the expression (2), and the number of reaction electrons at that time is 12. CO with the small number of reaction electrons and having a simple structure is easy to be produced even when the reduction electrode 1 having the plurality of metal nanowires 3 with small surface roughness is used, though the produced CO is easy to be adsorbed to smooth surfaces of the metal nanowires 3. If CO is adsorbed to the surfaces of the metal nanowires 3, the reduction reaction of CO further proceeds. The reduction reaction from CO to $C_2H_5OH$ proceeds in accordance with the expression (3), and the number of reaction electrons at that time is eight.

$$2CO_2+4H^++4e^-\rightarrow 2CO+2H_2O \quad (1)$$

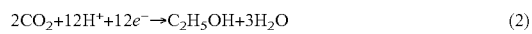

$$2CO_2+12H^++12e^-\rightarrow C_2H_5OH+3H_2O \quad (2)$$

$$2CO+8H^++8e^-\rightarrow C_2H_5OH+H_2O \quad (3)$$

As stated above, it is possible to reduce the number of electrons required for the reduction reaction from 12 to 8 by producing $C_2H_5OH$ from CO compared to a case when $C_2H_5OH$ is produced from $CO_2$. Further, it is possible to increase production efficiency of $C_2H_5OH$ by producing $C_2H_5OH$ through reduction of CO because a reaction potential from CO to $C_2H_5OH$ is smaller compared to a reaction potential from $CO_2$ to $C_2H_5OH$. At the surfaces of the metal nanowires 3, the reduction reaction from $CO_2$ to $C_2H_5OH$ occurs simultaneously in accordance with the expression (2). It is thereby possible to increase the production amount of the organic compounds such as $C_2H_5OH$ as the reduction product of $CO_2$ by using the reduction electrode 1 having the plurality of metal nanowires 3 with small surface roughness.

The reduction product of CO is not limited to ethanol ($C_2H_5OH$), but it is also possible to produce ethylene ($C_2H_4$), ethane ($C_2H_6$), methanol ($CH_3OH$), acetic acid ($CH_3COOH$), methane ($CH_4$), propanol ($C_3H_7OH$), and so on as illustrated in the following expression (4) to expression (9). As is described later, it is also possible to increase a production amount of formic acid (HCOOH) as the reduction product of $CO_2$ as illustrated in the expression (10) depending on a combination of the reduction electrode 1 having the plurality of metal nanowires 3 with small surface roughness and an electrolytic solution.

$$2CO+8H^++8e^-\rightarrow C_2H_4+2H_2O \quad (4)$$

$$2CO+10H^++10e^-\rightarrow C_2H_6+2H_2O \quad (5)$$

$$CO+4H^++4e^-\rightarrow CH_3OH \quad (6)$$

$$2CO+4H^++4e^-\rightarrow CH_3COOH \quad (7)$$

$$CO+6H^++6e^-\rightarrow CH_4+H_2O \quad (8)$$

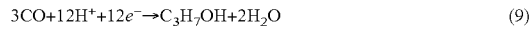

$$3CO+12H^++12e^-\rightarrow C_3H_7OH+2H_2O \quad (9)$$

$$CO_2+2H^++2e^-\rightarrow HCOOH \quad (10)$$

In the reduction electrode 1 of the embodiment, each of the plurality of metal nanowires 3 provided on the metal base material 2 preferably has a length of 1 μm or more to effectively induce the reduction reaction of $CO_2$. When the length of the metal nanowire 3 is less than 1 μm, it is not possible to enough obtain the efficiency of the reduction reaction of $CO_2$ based on an effect of the shape. Further, the plurality of metal nanowires 3 include the metal nanowires whose average height (Zc) of contour curve of the surface is 20 nm or less for 50% or more in a number ratio to obtain the above-stated adsorption effect of CO and the reduction effect of CO based thereon. When the average height Zc of the metal nanowire exceeds 20 nm, the adsorption effect of CO cannot be enough obtained. When the number ratio of the metal nanowires as stated above is less than 50%, an increase effect of the production amount of the organic compounds due to the reduction of CO cannot be obtained. The average height Zc of the metal nanowire is more preferably 10 nm or less. The number ratio of the metal nanowires whose the average height Zc is 20 nm or less is more preferably 70% or more.

The average height Zc of the contour curve of the surface of the metal nanowires, and the number ratio of the metal nanowires whose the average height Zc is 20 nm or less are found as described below. At first, a two-dimensional image of the plurality of metal nanowires in a measurement range of 1 µm×1 µm is acquired by using a scanning electron microscope (SEM). Further, the measurement range is magnified, and the contour curves of the metal nanowires are extracted by image processing software. The average height Zc is found from the extracted contour curves of the metal nanowires. Among the plurality of metal nanowires existing in the measurement range, the number of metal nanowires whose the average height Zc is 20 nm or less is found, and the number ratio (%) of the metal nanowires is found from the number of metal nanowires existing in the measurement range. A reference length to extract the average height is set to a length of an arbitrary 200 nm where the metal nanowires existing in the measurement range are not intentionally selected. It is necessary to limit the reference length to 200 nm in order to measure the height of 20 nm of the contour curve due to a resolution and a depth of field of the image obtained by the SEM.

The average height Zc of the respective metal nanowires is found as described below. Respective heights (Zt1, Zt2, . . . Ztn) of contour curve elements in the reference length are found from the contour curves of the metal nanowires extracted by the image processing software, then an average value of these heights ((Zt1+Zt2+ . . . Ztn))/n) is found as the average height Zc. Here, the contour curve element is one where a peak and a trough adjacent with each other are set as a pair, and a height from the trough to the peak is set to the height of the contour curve element. At this time, there are rules of a minimum height and a minimum length in the peaks (troughs) constituting the contour curve element, where one whose height (depth) is 10% or less of a maximum height (Zmax) or whose length is 1% or less of a length of a measurement section is regarded as a noise, to be recognized as a part of the trough (peak) prior or subsequent thereto.

Figure 3:
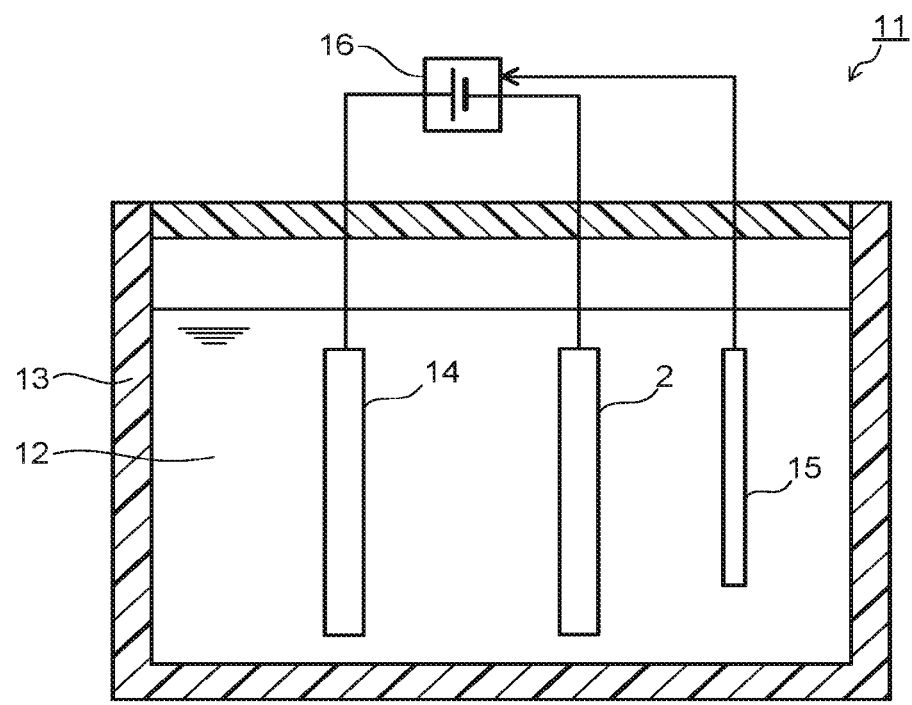
FIG. 3 is a sectional view illustrating an example of an electrochemical reaction device used in the manufacturing process of the reduction electrode according to the embodiment.

Next, a manufacturing method of the reduction electrode 1 having the above-stated plurality of metal nanowires 3 is described with reference to FIG. 2 and FIG. 3. FIG. 2 is a view illustrating a manufacturing process of the reduction electrode 1 having the plurality of metal nanowires 3, and FIG. 3 is a sectional view illustrating an example of an electrochemical reaction device used in the manufacturing process of the reduction electrode. At first, the metal base material 2 made up of the above-stated metal material is prepared. A surface of the metal base material 2 is washed by using an organic solvent such as acetone, further etching is performed by using an acid solution to thereby expose a clean surface at the metal base material 2 (FIG. 2-101/process 1).

The metal base material 2 is heated by an electric furnace or the like, to thermally oxidize the surface of the metal base material 2, and thereby, a plurality of metal oxides each having a nanowire shape are formed on the metal base material 2 (FIG. 2-102/process 2). A heating temperature of the metal base material 2 is preferably set to a temperature in a range of 200° C. to 900° C. When the heating temperature is less than 200° C., there is a possibility that the thermal oxidation of the metal base material 2 cannot be enough proceeded. When the heating temperature exceeds 900° C., the thermal oxidation of the metal base material 2 becomes vigorous, and the shapes of the metal oxides (nanowire shapes) cannot be enough controlled. The heating temperature is more preferably in a range of 300° C. to 700° C., and further preferably in a range of 400° C. to 550° C. Besides, a heating time is preferably one hour or more, and more preferably three hours or more. The heating temperature and the heating time as stated above are applied, and thereby, it is possible to form the metal oxides capable of stably obtaining the metal nanowires 3 whose average length is 1 µm or more.

Next, the plurality of metal oxides each having the nanowire shape (metal oxide wires) formed on the metal base material 2 are reduced by the electrochemical reduction method to thereby form the plurality of metal nanowires 3 on the metal base material 2 (FIG. 2-103/process 3). The reduction process of the metal oxide wires is performed by using, for example, an electrochemical reaction device 11 illustrated in FIG. 3. The electrochemical reaction device 11 includes an electrolytic tank 13 storing an electrolytic solution 12. A counter electrode 14 and a reference electrode 15 are immersed in the electrolytic solution 12 filled in the electrolytic tank 13. The metal base material 2 having the plurality of metal oxide wires is immersed in the electrolytic solution 12 as a working electrode facing the counter electrode 14.

The electrochemical reaction device 11 includes a potentiostat or the like as a power supply 16. The counter electrode 14 is connected to a positive electrode (+) terminal of the power supply 16, and acts as an anode (oxidation electrode). The metal base material 2 as the working electrode is connected to a negative electrode (−) terminal of the power supply 16, and acts as a cathode (reduction electrode). The reference electrode 15 is electrically connected to a reference electrode terminal of the power supply 16. The counter electrode 14 is constituted by an electrochemically stable material such as platinum (Pt), gold (Au), and stainless (SUS). The reference electrode 15 is an electrode to be a reference of a potential at the electrochemical reaction time, and is constituted by, for example, a silver (Ag)-silver chloride (AgCl) electrode, a calomel electrode, and so on.

The electrolytic solution 12 preferably contains at least one selected from lithium ions ($Li^+$), sodium ions ($Na^+$), potassium ions ($K^+$), cesium ions ($Cs^+$), calcium ions ($Ca^{2+}$), magnesium ions ($Mg^{2+}$), chloride ions ($Cl^-$), bromide ions ($Br^-$), iodide ions ($I^-$), hydrogen carbonate ions ($HCO_3^-$), carbonate ions ($CO_3^{2-}$), nitrate ions ($NO_3^-$), sulfate ions ($SO_4^{2-}$), phosphate ions ($PO_4^{2-}$), and borate ions ($BO_3^{3-}$) to adjust conductivity. $CO_2$ gas may be introduced into the electrolytic solution 12 to adjust, for example, a concentration of the carbonate ions.

A reduction process of the metal oxide wires includes a first process where a current is passed through the metal base material 2 under a constant current condition (FIG. 2-103A/ process 3A), and a second process where the current is passed through the metal base material 2 under a constant potential condition (FIG. 2-103B/process 3B). When the electrochemical reaction device 11 illustrated in FIG. 3 is used, at first, the current is passed from the power supply 16 through the metal base material 2 immersed in the electrolytic solution 12 under the constant current condition (process 3A). At this time, an absolute value of the current passed through the metal base material 2 is set to 5 mA/cm$^2$ or more, and more preferably 10 mA/cm$^2$ or more. A time passing the current through the metal base material 2 in the process 3A is preferably 20 minutes to 60 minutes. Then the current is passed from the power supply 16 through the metal base material 2 under the constant potential condition (process 3B) subsequent to the process 3A. The constant potential in the process 3B is a potential applied on the cathode (metal base material 2) relative to the reference electrode 15, and a value thereof is not particularly limited, but it is preferably a potential or more capable of passing the current of 5 mA/cm$^2$ or more. A time passing the current through the metal base material 2 in the process 3B is preferably 20 minutes to 60 minutes.

As stated above, the first process where the current is passed under the constant current condition (process 3A) and the second process where the current is passed under the constant potential condition (process 3B) are continuously performed for the metal base material 2 having the metal oxide wires, and thereby, it is possible to finely perform the reduction process of the metal oxide wires, and to control a surface state of the metal nanowires formed by the reduction of the metal oxide wires. The absolute value of the constant current in the process 3A is set to a relatively large value (5 mA/cm$^2$ or more), and thereby, it is possible to control the average height Zc of the surfaces of the metal nanowires to be 20 nm or less, and to obtain the reduction electrode 1 having the metal nanowires 3 which include the metal nanowires whose average height Zc is 20 nm or less for 50% or more in the number ratio.

Second Embodiment/Electrolytic Device

Figure 4:
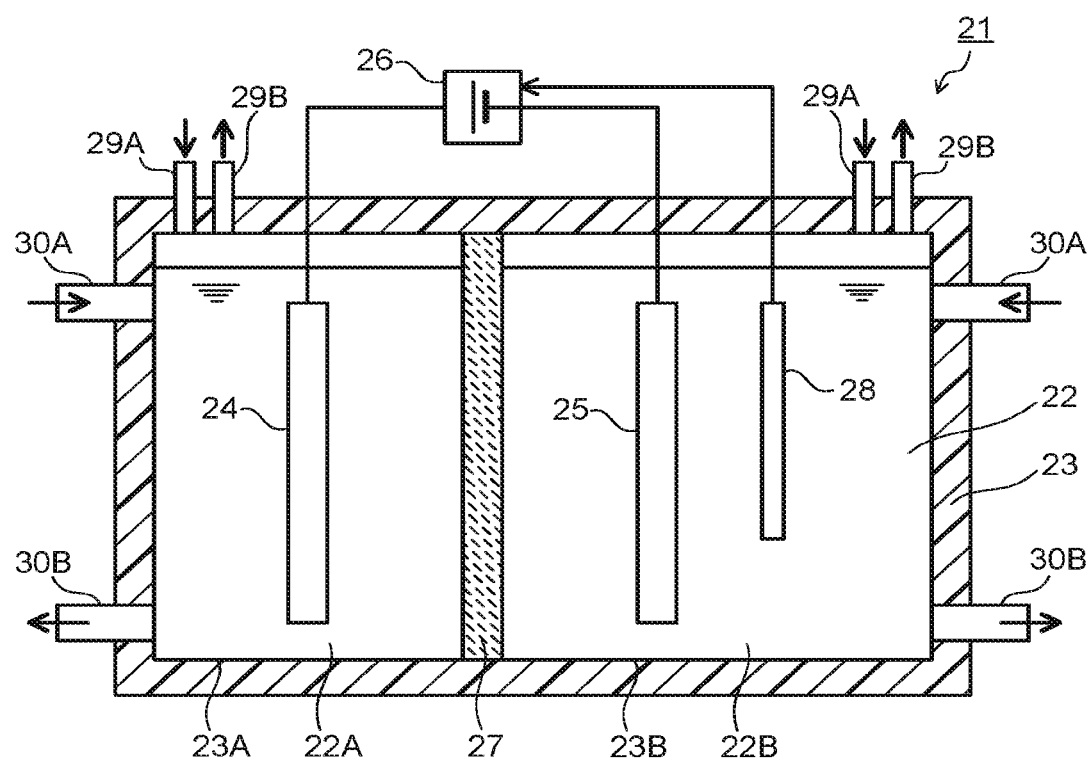
FIG. 4 is a sectional view illustrating an electrolytic device according to the embodiment.

Next, an electrolytic device using the reduction electrode 1 according to the first embodiment is described with reference to FIG. 4. An electrolytic device 21 illustrated in FIG. 4 includes an electrolytic tank 23 storing an electrolytic solution 22 containing water ($H_2O$) and carbon dioxide ($CO_2$), a first electrode 24, a second electrode 25, and a power supply 26. The first and second electrodes 24, 25 are disposed in the electrolytic tank 23, and immersed in the electrolytic solution 22. The power supply 26 is disposed outside the electrolytic tank 23. The power supply 26 is connected to the first electrode 24 and the second electrode 25.

The electrolytic tank 23 is separated into two chambers by an ion migrating layer (an ion migrating layer also works as a separation wall) 27 capable of migrating ions. The electrolytic tank 23 separated into the two chambers includes a first storage part 23A storing a first electrolytic solution 22A where the first electrode 24 is immersed and a second storage part 23B storing a second electrolytic solution 22B where the second electrode 25 is immersed. The first electrode 24 is disposed in the first storage part 23A, and the second electrode 25 is disposed in the second storage part 23B. A reference electrode 28 which controls a current flowing between the first electrode 24 and the second electrode 25 and a potential of the second electrode 25 is disposed at the second storage part 23B. The reference electrode 28 is disposed according to need.

The ion migrating layer 27 is constituted by an ion exchange membrane or the like capable of migrating ions between the first electrode 24 and the second electrode 25, and separating the first electrolytic solution 22A and the second electrolytic solution 22B. As the ion exchange membrane, for example, cation exchange membranes such as Nafion and Flemion, anion exchange membranes such as Neosepta, Selemion are used. Other than the above, a material can be used as the ion migrating layer 27 as long as it is a material capable of migrating ions between the first electrode 24 and the second electrode 25. An inlet pipe 29A and an outlet pipe 29B of gas, and an inlet pipe 30A and an outlet pipe 30B of solution are connected to the electrolytic tank 23. They are respectively provided at the first storage part 22A and the second storage part 22B. The outlet pipe 29B of gas is connected to a collection part (not-illustrated) of products produced by an oxidation-reduction reaction.

The first electrode 24 is an electrode which causes an oxidation reaction of water ($H_2O$) in the electrolytic solution 22 and produces oxygen ($O_2$) and hydrogen ions ($H^+$). The second electrode 25 is an electrode which causes a reduction reaction of carbon dioxide ($CO_2$) in the electrolytic solution 22 and a reduction reaction of the carbon compounds obtained by the above, and produces the carbon compounds. The first electrode 24 is connected to a positive electrode (+) terminal of the power supply 26 to cause the oxidation reaction at the first electrode 24. The second electrode 25 is connected to a negative electrode (−) terminal of the power supply 26 to cause the reduction reaction at the second electrode 25.

The second electrode 25 is the electrode which reduces carbon dioxide to produce the carbon compounds, and the reduction electrode 1 according to the first embodiment is used. The first electrode 24 is preferably constituted by a material capable of oxidizing water and producing oxygen and the hydrogen ions, and decreasing overpotential of such reaction. As the material, there can be cited metals such as platinum (Pt), palladium (Pd), and nickel (Ni), alloys and intermetallic compounds containing these metals, binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as an Ru complex and an Fe complex. It is possible to apply various shapes such as a plate state, a mesh state, a wired state, a particle state, a porous state, a thin-film state, and an island state for the first electrode 24. A composite electrode where these materials are stacked on a base material may be applied for the first electrode 24.

The first electrolytic solution 22A is a solution containing at least water ($H_2O$), and the second electrolytic solution 22B is a solution containing at least carbon dioxide ($CO_2$). The same solution may be applied or different solutions may be applied for the first electrolytic solution 22A and the second electrolytic solution 22B. When the same solution is applied for the first electrolytic solution 22A and the second electrolytic solution 22B, a one-solution type electrolytic tank 23 may be applied.

As a solution containing $H_2O$, for example, an aqueous solution containing an arbitrary electrolyte is used. This solution is preferably an aqueous solution which accelerates the oxidation reaction of $H_2O$. As the aqueous solution containing the electrolyte, there can be cited, for example, aqueous solutions containing the phosphate ions ($PO_4^{2-}$), the borate ions ($BO_3^{3-}$), the hydrogen carbonate ions ($HCO_3^-$), the sodium ions ($Na^+$), the potassium ions ($K^+$), the calcium ions ($Ca^{2+}$), the lithium ions ($Li^+$), the cesium ions ($Cs^+$), the magnesium ions ($Mg^{2+}$), the chloride ions ($Cl^-$), the bromide ions ($Br^-$), the iodine ions ($I^-$), and so on.

The solution containing $CO_2$ is preferably a solution having high absorptance of $CO_2$, and there can be cited aqueous solutions such as $LiHCO_3$, $NaHCO_3$, $KHCO_3$, and $CsHCO_3$. The alcohols such as methanol, ethanol, and acetone may be used for the solution containing $CO_2$. The solution containing $H_2O$ and the solution containing $CO_2$ may be the same solution, but the solution containing $CO_2$ preferably has a high absorption amount of $CO_2$, and therefore, a solution different from the solution containing $H_2O$ may be used. The solution containing $CO_2$ is desirably an electrolytic solution containing $CO_2$ absorbent which lowers a reduction potential of $CO_2$, has high ion conductivity, and absorbs $CO_2$.

As the above-stated electrolytic solution, there can be cited an ionic liquid which is made of salts of cations such as imidazolium ions or pyridinium ions and anions such as $BF_4^-$ or $PF_6^-$ and which is in a liquid state in a wide temperature range, or aqueous solutions thereof. As other electrolytic solutions, there can be cited amine solutions such as ethanolamine, imidazole, pyridine, or aqueous solutions thereof. As amine, any of primary amine, secondary amine, and tertiary amine can be used. As the primary amine, there can be cited methylamine, ethylamine, propylamine, butylamine, pentylamine, hexylamine, and so on. Hydrocarbons of the amine may be substituted by alcohol, halogen, and so on. As the amine whose hydrocarbons are substituted, there can be cited methanolamine, ethanolamine, chloromethyl amine, and so on. Further, an unsaturated bond may exist. These hydrocarbons are also applied to the secondary amine and the tertiary amine. As the secondary amine, there can be cited dimethylamine, diethylamine, dipropylamine, dibutylamine, dipentylamine, dihexylamine, dimethanolamine, diethanolamine, dipropanolamine, and so on. The substituted hydrocarbons may be different. This also applies to the tertiary amine. For example, as an example whose hydrocarbons are different, there can be cited methylethylamine, methylpropylamine, and so on. As the tertiary amine, there can be cited trimethylamine, triethylamine, tripropylamine, tributylamine, trihexylamine, trimethanolamine, triethanolamine, tripropanolamine, tributanolamine, triexanolamine, methyldiethylamine, methyldipropylamine, and so on. As the cations of the ionic liquid, there can be cited 1-ethyl-3-methylimidazolium ions, 1-methyl-3-propylimidazolium ions, 1-butyl-3-methylimidazole ions, 1-methyl-3-pentylimidazolium ions, 1-hexyl-3-methylimidazolium ions, and so on. A second place of the imidazolium ions may be substituted. As an example whose second place of the imidazolium ions is substituted, there can be cited 1-ethyl-2,3-dimethylimidazolium ions, 1,2-dimethyl-3-propylimidazolium ions, 1-butyl-2,3-dimethylimidazolium ions, 1,2-dimethyl-3-pentylimidazolium ions, 1-hexyl-2,3-dimethylimidazolium ions, and so on. As the pyridinium ions, there can be cited methylpyridinium, ethylpyridinium, propylpyridinium, butylpyridinium, pentylpyridinium, hexylpyridinium, and so on. In both of the imidazolium ions and the pyridinium ions, an alkyl group may be substituted, or an unsaturated bond may exist. As the anions, there can be cited fluoride ions, the chloride ions, the bromide ions, the iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and so on. Dipolar ions in which the cations and the anions of the ionic liquid are coupled by hydrocarbons may be used.

Next, operations of the electrolytic device 21 are described. When the current is supplied from the power supply 26 to the first electrode 24, the oxidation reaction of water ($H_2O$) occurs in a vicinity of the first electrode 24 which is in contact with the first electrolytic solution 22A. Specifically, as illustrated in the following expression (11), $H_2O$ contained in the first electrolytic solution 22A is oxidized, and oxygen ($O_2$) and the hydrogen ions ($H^+$) are produced.

$$2H_2O \rightarrow 4H^+ + O_2 + 4e^- \qquad (11)$$

$H^+$ produced at the first electrode 24 side migrates in the electrolytic solutions 22A, 22B to reach in a vicinity of the second electrode 25. The reduction reaction of carbon dioxide ($CO_2$) occurs by the current (electrons ($e^-$)) supplied from the power supply 26 to the second electrode 25 and $H^+$ migrated to the vicinity of the second electrode 25.

In the reduction reaction process of $CO_2$, CO is easy to be produced in accordance with the expression (1) as stated above, though the produced CO is adsorbed to the smooth surfaces of the metal nanowires 3, and the reduction reaction of CO proceeds. Specifically, ethanol ($C_2H_5OH$) is produced in accordance with the expression (3). Besides, at the surfaces of the metal nanowires 3, the reduction reaction from $CO_2$ to $C_2H_5OH$ simultaneously occurs in accordance with the expression (2). As a result, the reduction electrode 1 having the plurality of metal nanowires 3 with small surface roughness is used, and thereby, it becomes possible to increase the production amounts and the production efficiency of the organic compounds such as $C_2H_5OH$ as the reduction product of $CO_2$. The reduction product of CO is not limited to $C_2H_5OH$ as stated above, and it is also possible to produce ethylene ($C_2H_4$), ethane ($C_2H_6$), methanol ($CH_3OH$), acetic acid ($CH_3COOH$), methane ($CH_4$), propanol ($C_3H_7OH$), and so on.

Next, examples and evaluation results thereof are described.

Example 1

Metal nanowires were formed in accordance with a procedure illustrated in FIG. 2. At first, Cu (purity of 6N) was cut out into 10 mm in width×20 mm in length×1 mm in thickness. This Cu plate was ultrasonic cleaned in acetone, dried by $N_2$ gas, and thereafter, immersed in a nitric acid solution for 30 seconds, then a surface thereof was etched. Next, a temperature of the Cu plate was increased from a room temperature to 500° C. at a rate of 100° C./h by using an electric furnace, then held at 500° C. for three hours to perform thermal oxidation, and thereafter, slowly cooled to the room temperature. A Cu base material having Cu oxide wires was thereby obtained. An atmosphere at the thermal oxidation time was in the air.

The Cu base material was processed by using an epoxy resin to be an electrode state with an exposing region of 10 mm×10 mm in one side. Next, Cu nanowires were formed by reducing Cu oxide wires on the Cu base material by using the electrochemical reaction device 11 illustrated in FIG. 3. At the electrochemical reaction device 11, a $KHCO_3$ solution at a concentration of 0.5 M was used as the electrolytic solution. The Cu base material was immersed in the electrolytic solution as the working electrode. A Pt wire was used as the counter electrode 14, and an Ag/AgCl standard electrode (NaCl: 3M) was used as the reference electrode 15. The $KHCO_3$ solution at the concentration of 0.5 M was prepared by introducing $CO_2$ gas into a $K_2CO_3$ solution at a concentration of 0.25 M. A pH value of the electrolytic solution was 7.2 to 7.3.

Figure 5A:
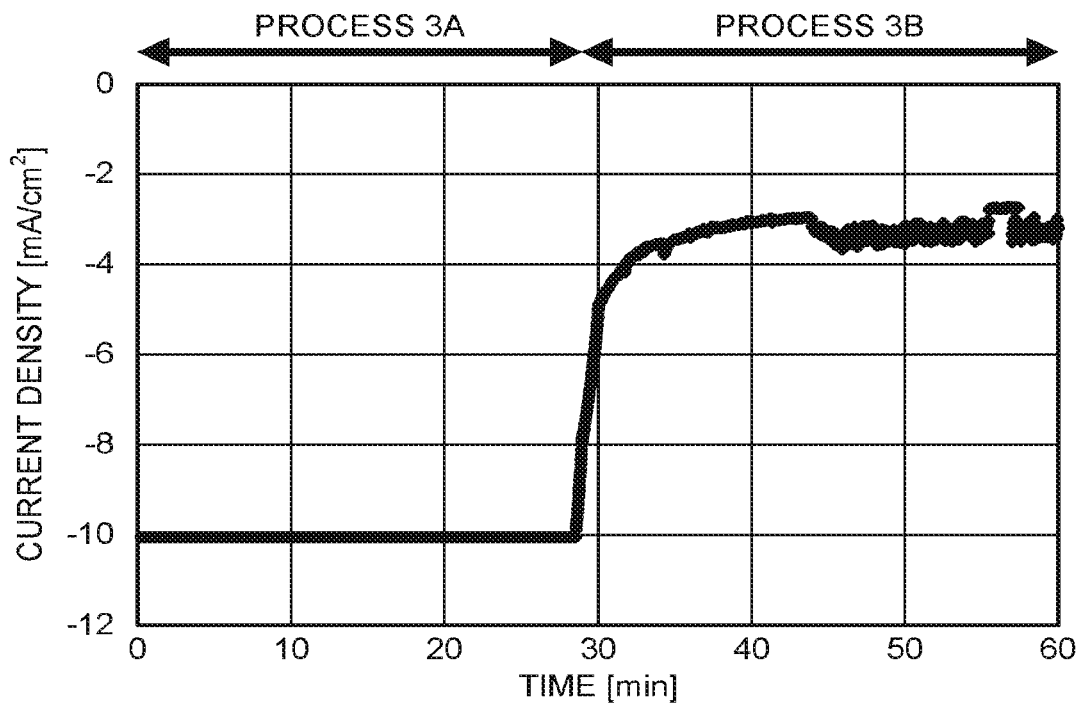
FIG. 5A and FIG. 5B are views respectively illustrating time dependence of a current density and a potential passed through a metal base material in a formation process of metal nanowires of an example 1.
Figure 5B:
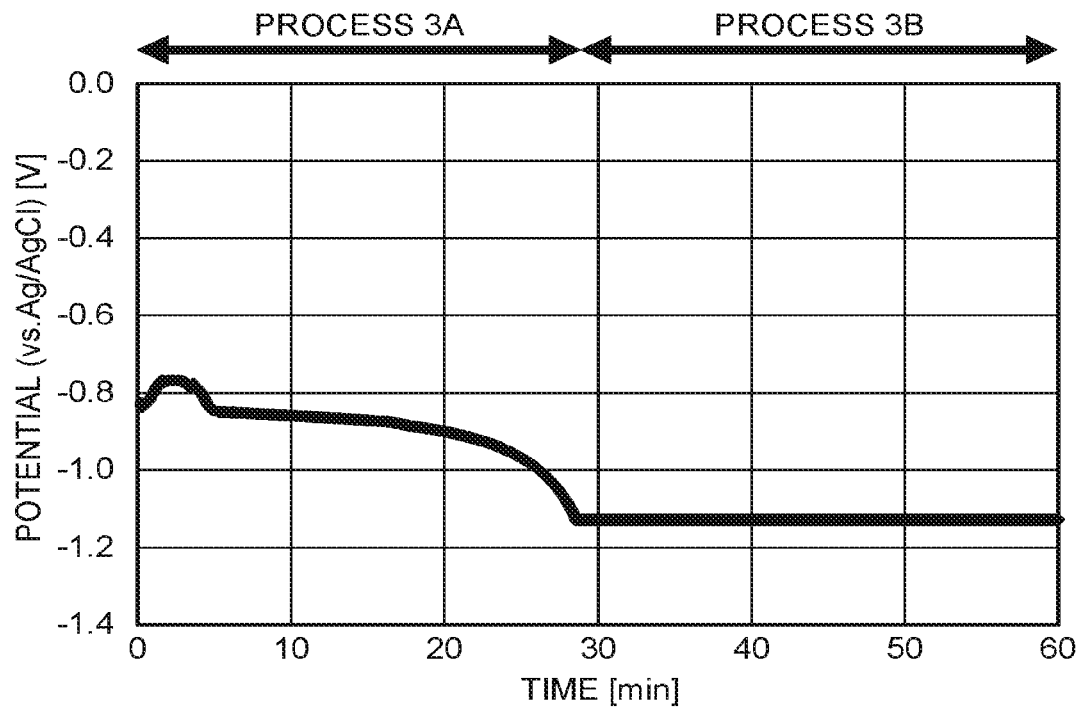

The current was passed through the Cu base material as the working electrode (cathode) to thereby reduce the Cu oxide to Cu. In the reduction process of the Cu oxide, a current passed through the Cu base material (cathode) and a potential of the Cu base material (cathode) relative to the reference electrode in the process 3A and the process 3B are illustrated in FIG. 5A and FIG. 5B. At first, a constant current of −10 mA/cm² was passed through the Cu base material (cathode) for approximately 30 minutes, and thereafter, the current was passed at a constant potential of −1.125 V (vs. Ag/AgCl) (−0.5 V (vs. RHE), pH: 7.2) for approximately 30 minutes. In the process 3A and the process 3B, the $CO_2$ gas was introduced into the electrolytic solution at a flow rate of 10 sccm. The plurality of Cu nanowires were thereby formed on the Cu base material to manufacture a Cu electrode (reduction electrode).

Figure 6A:
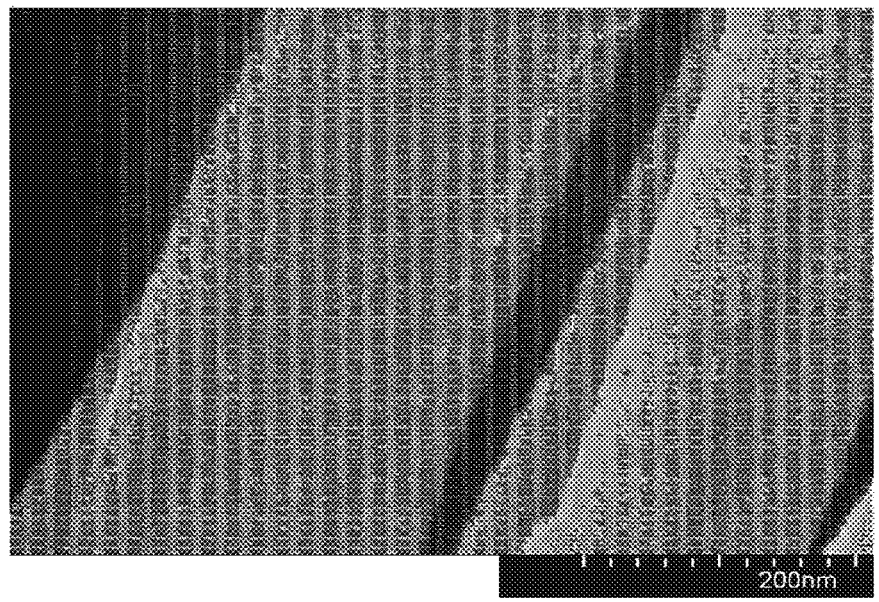
FIG. 6A and FIG. 6B are photographs each enlargedly illustrating an example of a surface state of the metal nanowires at a reduction electrode of the example 1.
Figure 6B:
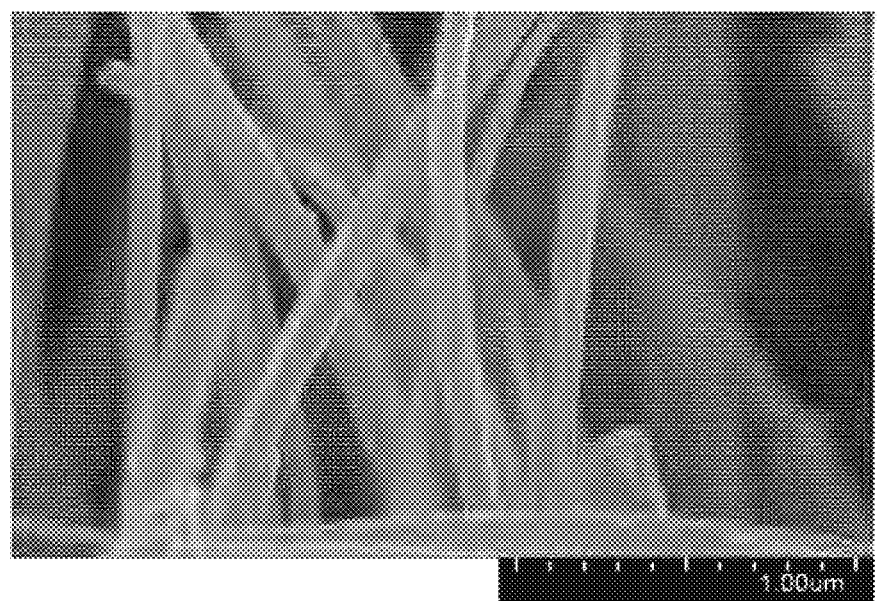

Surfaces of the Cu nanowires were observed by the SEM as for the Cu electrode obtained as stated above. SEM photographs (200 k magnification and 50 k magnification) are illustrated in FIG. 6A and FIG. 6B as observation results of the Cu nanowires. As it is clear from FIG. 6A and FIG. 6B, the Cu nanowires obtained by the example 1 have the small surface roughness. Further, each average height Zc of the surfaces of the plurality of Cu nanowires existing in the measurement range of 1 µm×1 µm, and the number ratio of the Cu nanowires whose average height Zc was 20 nm or less were found in accordance with the above-stated method. A reference length was set to an arbitrary 200 nm which was not intentionally selected. The average height Zc of the surfaces of the Cu nanowires and the number ratio of the Cu nanowires whose average height Zc is 20 nm or less existing in each of arbitrary region 1 and region 2 within the measurement range are illustrated in Table 1.

Example 2

In the manufacturing process of the Cu electrode (reduction electrode) in the example 1, the Cu electrode was manufactured under the same condition as the example 1 except that the constant current condition in the process 3A was set to −5 mA/cm$^2$. The surfaces of the Cu nanowires at the obtained Cu electrode were SEM observed, and each average height Zc of the surfaces of the plurality of Cu nanowires, and the number ratio of the Cu nanowires whose average height Zc was 20 nm or less were found as same as the example 1. These results are illustrated in Table 1.

Comparative Example 1

Figure 7A:
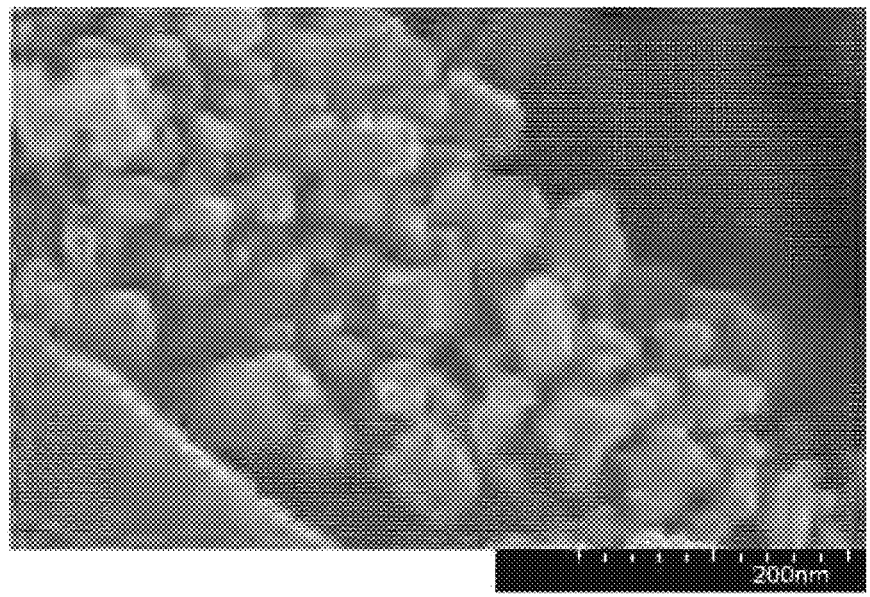
FIG. 7A and FIG. 7B are photographs each enlargedly illustrating an example of a surface state of metal nanowires at a reduction electrode of a comparative example 1.
Figure 7B:
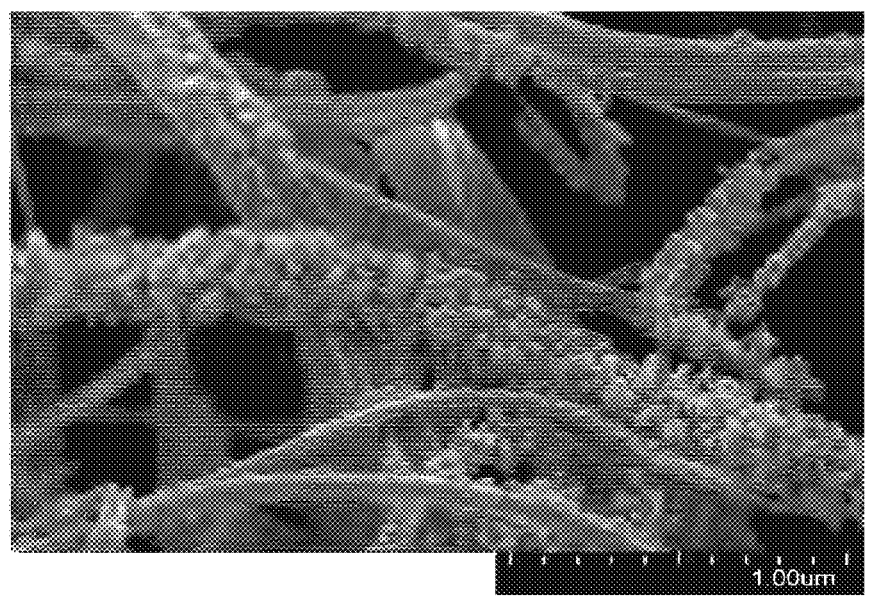

In the manufacturing process of the Cu electrode (reduction electrode) in the example 1, the Cu electrode was manufactured under the same condition as the example 1 except that the constant current condition in the process 3A was set to −3 mA/cm$^2$. The surfaces of the obtained Cu nanowires were observed by the SEM. SEM photographs (200 k magnification and 50 k magnification) are illustrated in FIG. 7A and FIG. 7B as observation results of the Cu nanowires. As it is clear from FIG. 7A and FIG. 7B, the Cu nanowires obtained by the comparative example 1 have large surface roughness. Each average height Zc of the surfaces of the plurality of Cu nanowires, and the number ratio of the Cu nanowires whose average height Zc was 20 nm or less were found as same as the example 1. These results are illustrated in Table 1.

TABLE 1

| | Current Density In Process 3a [mA/cm$^2$] | Average Height Of Surfaces Of Cu Nanowires | | Number Ratio of Nanowires Whose Average Height is 20 nm or less [%] |
| --- | --- | --- | --- | --- |
| | | Region 1 [nm] | Region 2 [nm] | |
| Example 1 | −10 | 6 | 8 | 90 |
| Example 2 | −5 | 10 | 10 | 50 |
| Comparative Example 1 | −3 | 31 | 30 | 30 |

As it was clear from Table 1, as for the Cu electrode formed in the example 1, the average heights Zc of the surfaces of the Cu nanowires existing at the arbitrary region 1 and region 2 were small to be respectively 6 nm and 8 nm, and the number ratio of the Cu nanowires whose average height Zc was 20 nm or less was large to be 90%. It was the same as for the Cu electrode formed in the example 2. On the other hand, as for the Cu electrode formed in the comparative example 1, the average heights Zc of the surfaces of the Cu nanowires existing at the arbitrary region 1 and region 2 were large to be respectively 31 nm and 30 nm, and the number ratio of the Cu nanowires whose average height Zc was 20 nm or less was little to be 30%.

Next, reduction characteristics of $CO_2$ were evaluated by using the Cu electrodes manufactured in the example 1, the example 2, and the comparative example 1. The evaluations of the reduction characteristics of $CO_2$ were performed by using the electrolytic device 21 illustrated in FIG. 4. At the electrolytic device 21, the $KHCO_3$ solution at the concentration of 0.5 M was used as the electrolytic solution 22, the potential of −0.6 V (vs. RHE) was applied for 30 minutes while introducing the $CO_2$ gas into the electrolytic solution 22 at the flow rate of 10 sccm to reduce $CO_2$ in the electrolytic solution 22. A potential E (vs. RHE) relative to a reversible hydrogen electrode was calculated by the following expression from a potential E (vs. Ag/AgCl) relative to the Ag/AgCl reference electrode.

$$E(\text{vs. RHE}) = E(\text{vs. Ag/AgCl}) + 0.195 + 0.591 \times pH$$

Gas generated by the reduction of $CO_2$ was collected with a bag, and thereafter, a CO amount in the gas was examined by a GC (gas chromatography). After the reduction of $CO_2$, the electrolytic solution was taken out, and an ethanol amount in the electrolytic solution was examined by a GC-MS (gas chromatography mass spectrometer). A current density $J_{partial}$ [mA/cm$^2$] which contributed to the production of CO or ethanol was calculated from a CO production amount S (CO) [mol/s] and an ethanol production amount S (ethanol) [mol/s] per a unit time by the following expression.

$$J_{partial} = z \times q \times N_A \times S \times A^{-1}$$

Here, "q" is an elementary charge ($1.60 \times 10^{-19}$ C), "$N_A$" is an Avogadro's constant ($6.02 \times 10^{23}$/mol), and "A" is an electrode area (cm$^2$). "z" is the number of reaction electrons, and it is 2 in case of CO, and is 12 in case of ethanol. Besides, a current efficiency FE being a ratio of a current density which contributed to the production of CO or ethanol relative to a total current density $J_{total}$ was found by the following expression.

$$FE = (J_{partial}/J_{total}) \times 100$$

Evaluation results of the reduction characteristics of $CO_2$ performed by using the Cu electrode of the example 1, the Cu electrode of the example 2, and the Cu electrode of the comparative example 1 are collectively illustrated in Table 2. As illustrated in Table 2, in each of the reduction reactions of $CO_2$ using the Cu electrodes of the example 1 and the example 2, it turned out that the current density which contributed to the production of ethanol and the current efficiency were larger than those of the comparative example 1. It was therefore verified that ethanol could be efficiently produced by making the surface roughness of the Cu nanowires small. On the other hand, in the reduction reaction of $CO_2$ using the Cu electrode of the comparative example 1, it turned out that the current density which contributed to the production of CO and the current efficiency were larger than the cases using the Cu electrodes of the example 1 and the example 2.

TABLE 2

|  | Current density in process 3a [mA/cm$^2$] | Current density which contributed to production of ethanol [mA/cm$^2$] | Current efficiency of ethanol [%] | Current density which contributed to production of CO [mA/cm$^2$] | Current efficiency of CO [%] |
|---|---|---|---|---|---|
| Example 1 | −10 | 0.20 | 3.8 | 0.42 | 8.2 |
| Example 2 | −5 | 0.21 | 4.0 | 0.37 | 7.2 |
| Comparative Example 1 | −3 | 0.06 | 2.4 | 0.60 | 23.9 | electrolytic condition: −0.6 v (vs. RHE)

Example 4

The reduction characteristics of $CO_2$ were evaluated by using the Cu electrode and the electrolytic device as same as the example 1 except that a KCl solution at a concentration of 0.5 M was used as the electrolytic solution.

Example 5

The reduction characteristics of $CO_2$ were evaluated by using the Cu electrode and the electrolytic device as same as the example 1 except that a KCl solution at a concentration of 2 M was used as the electrolytic solution.

Example 6

The reduction characteristics of $CO_2$ were evaluated by using the Cu electrode and the electrolytic device as same as the example 1 except that a KBr solution at a concentration of 0.5 M was used as the electrolytic solution.

Example 7

The reduction characteristics of $CO_2$ were evaluated by using the Cu electrode and the electrolytic device as same as the example 1 except that a KI solution at a concentration of 0.5 M was used as the electrolytic solution.

In the above-stated examples 1 to 6, differences in the reduction characteristics of $CO_2$ and $H_2O$ depending on the electrolytic solutions are compared. At first, the electrolytic solution in each of the examples was used as the electrolytic solution 22 at the electrolytic device 21, the potential of −0.6 V (vs. RHE) was applied for 30 minutes while introducing the $CO_2$ gas into the electrolytic solution 22 at the flow rate of 10 sccm to reduce $CO_2$ in the electrolytic solution 22. Production results of ethanol, CO, and hydrogen at this time are illustrated in Table 3. Compared to the example 1, it can be seen that the current efficiency of CO production is large and the current efficiency of $H_2$ production is small in each of the example 3 and the example 5. Namely, it turned out that the production efficiency of CO increased, and the production efficiency of $H_2$ was suppressed relatively at the electrolytic devices where Cl⁻ and Br⁻ were contained in the electrolytic solutions.

TABLE 3

|  | Electrolytic solution | Current density which contributed to production of ethanol [mA/cm$^2$] | Current efficiency of ethanol [%] | Current density which contributed to production of CO [mA/cm$^2$] | Current efficiency of CO [%] | Current density which contributed to production of hydrogen [mA/cm$^2$] | Current efficiency of hydrogen [%] |
|---|---|---|---|---|---|---|---|
| Example 1 | KHCO$_3$ (0.5M) | 0.20 | 3.8 | 0.42 | 8.2 | 2.3 | 45.5 |
| Example 3 | KCl (0.5M) | 0.09 | 4.9 | 0.48 | 27.5 | 0.3 | 19.8 |
| Example 5 | KBr (0.5M) | 0.04 | 3.6 | 0.47 | 38.5 | 0.1 | 9.9 |
| Example 6 | KI (0.5M) | — | — | 0.01 | 0.9 | 0.3 | 45.5 |

Electrolytic condition: −0.6 v (vs. RHE)

Next, results are illustrated in Table 4 when the potential was set to −0.7 V (vs. RHE) being a further lower potential, namely, the potential with large overpotential. It can be seen that the current efficiency of ethanol is large and the current efficiency of $H_2$ is small in each of the example 3 and the example 5 compared to the example 1. In consideration of the result where the production efficiency of $H_2$ was suppressed at −0.6 V (vs. RHE), the production efficiency of $H_2$ was suppressed at the electrolytic devices where Cl⁻ and Br⁻ were contained in the electrolytic solutions and the production efficiency of ethanol increased when the potential was set to a direction with further larger overpotential.

TABLE 4

|  | Electrolytic solution | Current density which contributed to production of ethanol [mA/cm$^2$] | Current efficiency of ethanol [%] | Current density which contributed to production of CO [mA/cm$^2$] | Current efficiency of CO [%] | Current density which contributed to production of hydrogen [mA/cm$^2$] | Current efficiency of hydrogen [%] |
|---|---|---|---|---|---|---|---|
| Example 1 | KHCO$_3$ (0.5M) | 0.44 | 4.5 | 0.26 | 2.7 | 6.1 | 62.5 |
| Example 3 | KCl (0.5M) | 0.57 | 12.7 | 0.17 | 3.8 | 2.2 | 50.1 |

TABLE 4-continued

|  | Electrolytic solution | Current density which contributed to production of ethanol [mA/cm²] | Current efficiency of ethanol [%] | Current density which contributed to production of CO [mA/cm²] | Current efficiency of CO [%] | Current density which contributed to production of hydrogen [mA/cm²] | Current efficiency of hydrogen [%] |
|---|---|---|---|---|---|---|---|
| Example 5 | KBr (0.5M) | 0.38 | 11.4 | 0.29 | 8.2 | 1.3 | 36.7 |
| Example 6 | KI (0.5M) | — | — | 0.17 | 12.6 | 0.3 | 25.3 |

Electrolytic condition: −0.7 v (vs. RHE)

Next, concentration dependences of a supporting electrolyte when ethanol is produced are compared. The production results of ethanol by the reduction of $CO_2$ at the potential in a vicinity of −0.6 V (vs. RHE) in the example 1, the example 3, and the example 4 are illustrated in Table 5. It turned out that the current density which contributed to the production of ethanol and the current efficiency were large in the example 4 compared to the example 1 and example 3, and it was possible to effectively produce ethanol by using the electrolytic device where a KCl concentration in the electrolytic solution was increased, namely, the concentration of $Cl^-$ was large.

Any combination of the structures of the above-stated embodiments is applicable, or a part thereof may be replaced. Here, certain embodiments have been described, but these embodiments have been presented by way of examples only, and are not intended to limit the scope of the inventions. These embodiments may be embodied in a variety of other forms, and various omissions, substitutions, changes and so on may be made without departing from the spirit of the inventions. These embodiments or modifications thereof are included in the scope and spirit of the inventions and included in the inventions described in the claims and their equivalents.

TABLE 5

|  | Electrolytic solution | Current density which contributed to production of ethanol [mA/cm²] | Current efficiency of ethanol [%] | Current density which contributed to production of co [mA/cm²] | Current efficiency of CO [%] | Current density which contributed to production of hydrogen [mA/cm²] | Current efficiency of hydrogen [%] |
|---|---|---|---|---|---|---|---|
| Example 1 | KHCO₃ (0.5M) | 0.20 | 3.8 | 0.42 | 8.2 | 2.3 | 45.5 |
| Example 3 | KCl (0.5M) | 0.09 | 4.9 | 0.48 | 27.5 | 0.3 | 19.8 |
| Example 4 | KCl (2M) | 0.45 | 16.2 | 0.2 | 7.7 | 0.8 | 26.9 |

Electrolytic condition: −0.6 v (vs. RHE)

Next, there is described a result where a unique phenomenon that formic acid was effectively produced when KI was used for the electrolytic solution was found. Production results of formic acid by the reduction of $CO_2$ at the potential in a vicinity of −0.7 V (vs. RHE) in the example 3, the example 5, and the example 6 are illustrated in Table 6. It can be seen that the current density which contributed to the production of formic acid and the current efficiency are each small in each of the example 3 and the example 5, though the current density which contributed to the production of formic acid is approximately an order of magnitude larger in the example 6, and the current efficiency is large to be 57%. It turned out that it was possible to effectively produce formic acid by using the electrolytic device where $I^-$ was contained in the electrolytic solution. Improvement effect of the production efficiency of formic acid is achieved due to a combination of the reduction electrode having the metal nanowires with small surface roughness, and the electrolytic solution containing $I^-$.

TABLE 6

|  | Electrolytic solution | Current density which contributed to production of formic acid [mA/cm²] | Current efficiency of formic acid [%] |
|---|---|---|---|
| Example 3 | KCl (0.5M) | 0.2 | 3.5 |
| Example 5 | KBr (0.5M) | 0.1 | 1.9 |
| Example 6 | KI (0.5M) | 1.2 | 57 |

Electrolytic condition: −0.7 v (vs. RHE)

What is claimed is:

1. A method for manufacturing of a reduction electrode, comprising:
   preparing a metal base material;
   forming a plurality of metal oxides each having a nanowire shape on the metal base material by thermally oxidizing a surface of the metal base material; and
   forming a plurality of metal nanowires on the metal base material by reducing the plurality of metal oxides by an electrochemical reduction method,
   wherein the plurality of metal nanowires forming includes a first process of passing a current under a constant current condition having a first current density with an absolute value between 0 and is 10 mA/cm² through the plurality of metal oxides, and a second process of passing a current under a constant potential condition having a second current density with an absolute value between 0 and 10 mA/cm² through the plurality of metal oxides, wherein the first and second current densities are not equal.

2. The manufacturing method of claim 1, wherein each of the plurality of metal nanowires has an external surface, and the plurality of metal nanowires include metal nanowires whose average height of a contour curve of the external surface is 20 nm or less for 50% or more in a number ratio, wherein the average height of the contour curve is an average value of heights of contour curve elements measured from the contour curve of the external surface of the metal nanowire.

3. The manufacturing method of claim 1, wherein the metal nanowire contains at least one selected from the group consisting of copper, silver, gold, platinum, palladium, nickel, cobalt, iron, manganese, titanium, cadmium, zinc, indium, gallium, lead, and tin.

4. The manufacturing method of claim 1, wherein the metal nanowire is made up of at least one selected from the group consisting of copper, an alloy containing copper, and an intermetallic compound containing copper.

5. The manufacturing method of claim 1, wherein each of the plurality of metal nanowires has an external surface, and the plurality of metal nanowires include metal nanowires whose average height of a contour curve of the external surface is 20 nm or less for 70% or more in a number ratio, wherein the average height of the contour curve is an average value of heights of contour curve elements measured from the contour curve of the external surface of the metal nanowire.

6. A method for manufacturing of an electrolytic device, comprising:
    producing a reduction electrode, comprising: preparing a metal base material; forming a plurality of metal oxides each having a nanowire shape on the metal base material by thermally oxidizing a surface of the metal base material; and forming a plurality of metal nanowires on the metal base material by reducing the plurality of metal oxides by an electrochemical reduction method to produce the reduction electrode;
    preparing an electrolytic tank to store an electrolytic solution containing water and carbon dioxide; and
    disposing the reduction electrode to produce a carbon compound by reducing the carbon dioxide and an oxidation electrode to produce oxygen by oxidizing the water in the electrolytic tank,
    wherein the forming plurality of metal nanowires includes a first process of passing a current under a constant current condition having a first current density with an absolute value between 0 and 10 mA/cm$^2$ through the plurality of metal oxides, and a second process of passing a current under a constant potential condition having a second current density with an absolute value between 0 and 10 mA/cm$^2$ through the plurality of metal oxides, wherein the first and second current densities are not equal.

7. The manufacturing method of claim 6, wherein each of the plurality of metal nanowires has an external surface, and the plurality of metal nanowires include metal nanowires whose average height of a contour curve of the external surface is 20 nm or less for 50% or more in a number ratio, wherein the average height of the contour curve is an average value of heights of contour curve elements measured from the contour curve of the external surface of the metal nanowire.

8. The manufacturing method of claim 6, wherein the metal nanowire contains at least one selected from the group consisting of: copper, silver, gold, platinum, palladium, nickel, cobalt, iron, manganese, titanium, cadmium, zinc, indium, gallium, lead, tin.

9. The manufacturing method of claim 6, wherein the metal nanowire is made up of at least one selected from the group consisting of: copper, an alloy containing copper, an intermetallic compound containing copper.

10. The manufacturing method of claim 6, wherein each of the plurality of metal nanowires has an external surface, and the plurality of metal nanowires include metal nanowires whose average height of a contour curve of the external surface is 20 nm or less for 70% or more in a number ratio, wherein the average height of the contour curve is an average value of heights of contour curve elements measured from the contour curve of the external surface of the metal nanowire.

* * * * *